United States Patent [19]

Russ

[11] Patent Number: 4,923,039

[45] Date of Patent: May 8, 1990

[54] INTERACTIVE DUAL SHAFT INPUT SIGNAL TIMING MECHANISM

[75] Inventor: David E. Russ, Rockford, Ill.

[73] Assignee: Sundstrand Corporation, Rockford, Ill.

[21] Appl. No.: 269,700

[22] Filed: Nov. 10, 1988

[51] Int. Cl.$^5$ ............................................. B60K 41/26
[52] U.S. Cl. ...................................... 192/7; 192/141; 192/148
[58] Field of Search ................... 192/7, 145, 148, 143, 192/141

[56] References Cited

U.S. PATENT DOCUMENTS

| | | |
|---|---|---|
| 1,242,260 | 10/1917 | Stone . |
| 1,787,342 | 11/1926 | Flowers . |
| 2,397,339 | 3/1946 | Crosby ............................ 192/143 X |
| 2,598,633 | 5/1952 | Baldwin ........................... 192/145 X |
| 3,016,228 | 1/1962 | Boomkens ......................... 192/16 X |
| 3,530,734 | 9/1968 | Wray et al. . |
| 3,792,618 | 2/1974 | Worrix . |
| 4,573,566 | 3/1986 | Roman . |
| 4,641,737 | 2/1987 | Gillingham et al. ................ 192/141 |
| 4,693,659 | 9/1987 | Burke et al. ..................... 192/143 X |

Primary Examiner—Rodney H. Bonck
Attorney, Agent, or Firm—Antonelli, Terry & Wands

[57] ABSTRACT

A timing mechanism (10) is provided in which input gear (11) is fixed on one shaft (12) for operating one system such as a door to move between two positions. A differential nut (14) is also provided on the shaft (12) for axial movement therealong. The differential nut (14) meshes with a first translating nut drive gear (2) rotatably arranged on a second shaft (19) which also contains a second translating nut drive gear (36) rotatably arranged thereon. The second gear (36) meshes with a differential nut (32) axially movable along a third shaft (26) for actuating a second system such as a pallet between two positions. The timing mechanism (10) is utilized in a system in which the output of each differential nut (14,32) is caused to operate a brake so that only one system will be in operation and the brake in the other system will not be released until the one system has completed its movement to a desired position.

28 Claims, 3 Drawing Sheets

PDU BLOCK DIAGRAM

DOOR OPENING          STATIONARY

DOOR OPEN

PALLET OPENING

PALLET CLOSING

INTERACTIVE DUAL SHAFT INPUT SIGNAL TIMING MECHANISM

TECHNICAL FIELD

The present invention relates to a timing mechanism and, more particularly, to a mechanism for driving two separate systems, for example an aircraft door and cargo pallet, in which each system provides input to the mechanism to provide accurate timing for the actuation of the respective other system.

BACKGROUND ART

In an effort to reduce weight and volume, especially in aircraft applications where many systems are actuated during aircraft operation, it has been conventional to utilize a single motor to drive two separate but related actuation systems sequentially. For instance, take the case of cargo bay doors and a pallet loaded and unloaded, sequentially into the cargo bay. The motor will open the cargo bay doors and then lower the cargo pallet after which the motor reverses to raise the loaded or unloaded cargo pallet as the case may be and then close the cargo bay doors. Because the motor has to coordinate two separate but related functions, there has been a necessity to provide a timing mechanism for shifting from the operation of one system to the operation of the other system. It has been found that over the passage of time, such mechanisms develop slip which creates problems of mistiming of the two systems.

In those applications where one or both of the systems has to be operated rapidly, friction devices are sometimes provided in conventional systems to slow the system down from full speed toward the end of its stroke. The presence of such friction devices can further distort the positional relationships between the two systems in relation to the motor with the result of less and less accurate timing.

DISCLOSURE OF THE INVENTION

The present invention is based upon the recognition that the timing problems encountered in the prior art could be avoided by utilizing the completion of operation of one system as an input to the other system and vice-versa. Thus, the problems of motor slippage in relation to the systems become moot since a signal to operate one system will not be generated until the other system has completed operation. The mechanism is, in essence, an interactive dual input signal timing mechanism which ensures accurate shift timing for both systems with or without motor slippage.

The objectives of the present invention have been achieved with the further recognition that a differential gear mechanism with overtravel stops of the general type disclosed in U.S. Pat. No. 4,641,737 for movement and positioning of aircraft flight surfaces could be used, with appropriate modification, to achieve accurate sequential control of two separate but related systems using one motor.

According to the present invention which is shown in block diagram in FIG. 1 to illustrate the basic components of the unit, a motor drives two systems, e.g. a pallet and door, through a two-speed shifter to a sun-to-sun differential which has two outputs, one for each system. Each output of the differential is associated with a brake so that one system is braked while the other system is in operation. In the case of the pallet and door example, if the pallet brake is activated, the door will be allowed to move and vice versa. A dual input timing mechanism receives the output of each system to provide an input signal to a brake actuation mechanism for actuating the appropriate brake.

BRIEF DESCRIPTION OF DRAWINGS

These and other features, objects and advantages of the present invention will become more apparent from the following description of the best mode for carrying out the present invention when taken in conjunction with the accompanying drawings wherein.

BEST MODE FOR CARRYING OUT THE INVENTION

Figure 1:
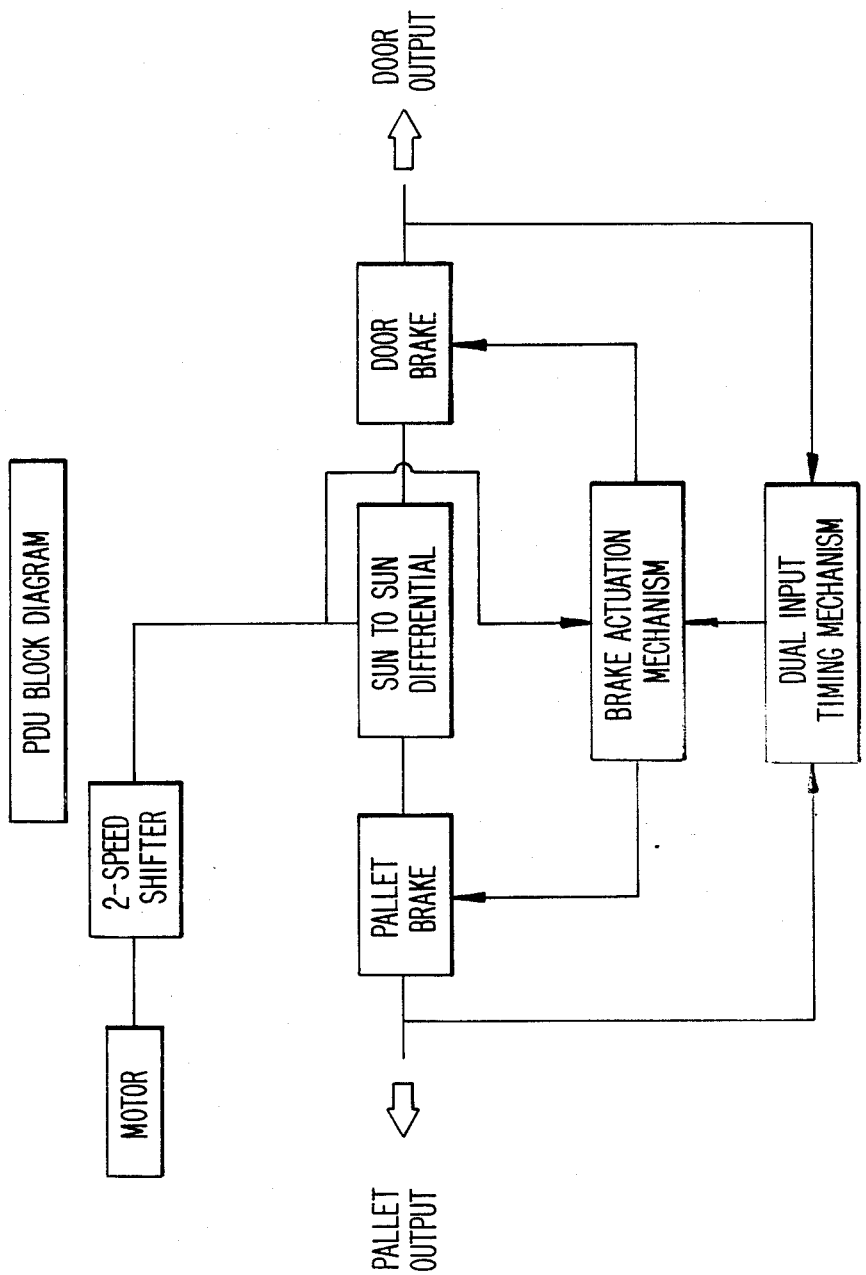
FIG. 1 is a schematic view of the overall unit used in connection with two exemplary systems such as a cargo pallet and door.
Figure 2:
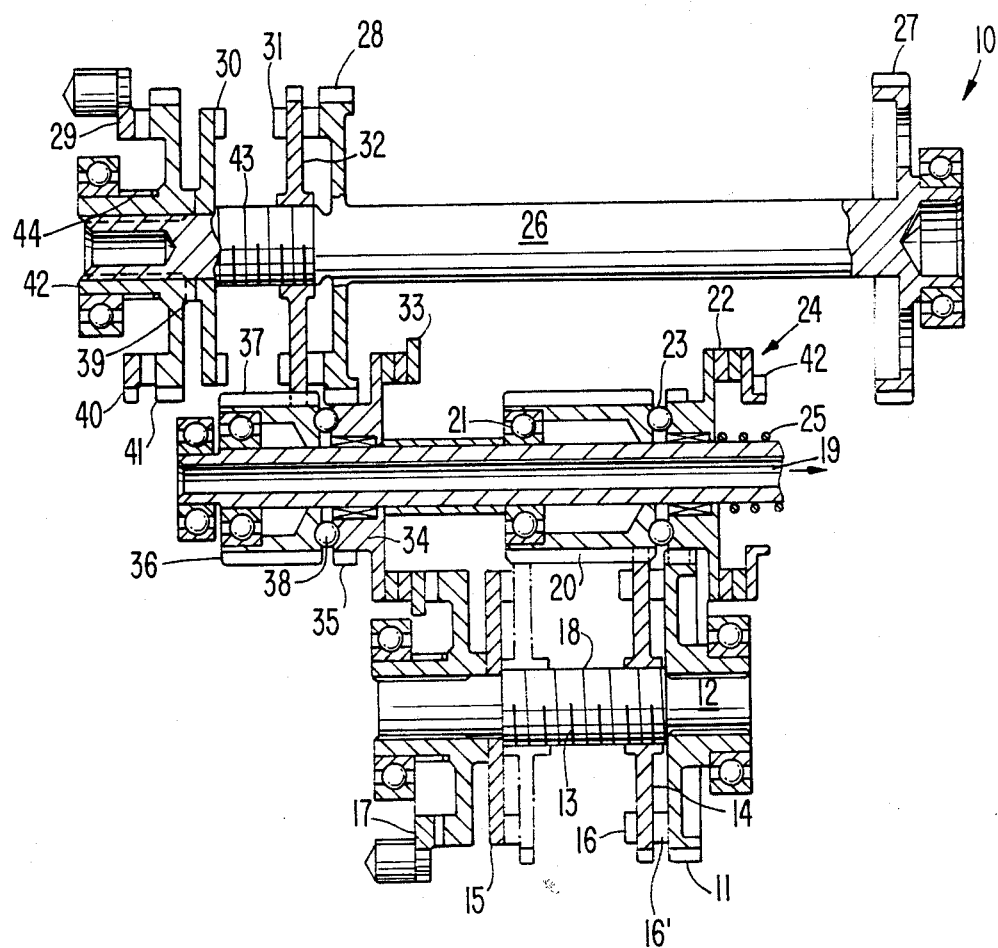
FIG. 2 is a cross-sectional view of the dual input timing mechanism which utilizes the output of one of the systems shown in FIG. 1 to actuate the brake of the other systems until completion of the stroke of the one system and vice versa.

Referring to FIG. 2, the dual input timing mechanism shown substantially in FIG. 1 is designated by the numeral 10. Certain details of the differential gear mechanism, particularly the overtravel stops, need not be described herein more than schematically because they are of the general type disclosed in the aforementioned U.S. Pat. No. 4,641,737.

A gear 11 is fixedly connected to a shaft 12 which is driven by the operation of one system, such as a door in the illustrated embodiment, which cycles between an opened and closed position. The shaft 12 is provided over the intermediate portion of its length with screw threads 13 with which a gear 14 in the form of a translating motion nut having trigger stops 16 on each side is matingly associated to move along with length of the shaft 12 until it abuts trigger stops 15,16'. At the end of the shaft 12 opposite the door input gear 11 are overtravel stops 17 of the type disclosed in U.S. Pat. No. 4,641,737 which signals by known means the attainment of one end of the cycle of the one system (in the illustration the closing of the aforementioned door) and prevents the differential gear 14 from overtravelling for any reason thereby causing damage to the system. A stop cam 18 is provided between the trigger stop 15 and the overtravel stops 17 to prevent further rotation of the shaft 12 when the trigger stop 15 is contacted by differential gear 14 and forced against overtravel stops 17.

A second shaft 19 which provides a trigger signal for operating the brake actuation mechanism (FIG. 1) has a translating nut drive gear 20 for the one system (e.g. the aforementioned door by way of illustration) which is rotatably mounted in a fixed axial location on the shaft 19 by way of bearings 21. A gear 22 rotates around the shaft 19 on conventional bearings or the like. A ball ramp 23 of a known type is provided between the gear 20 and the gear 22. Overtravel stops 24 of the type disclosed in U.S. Pat. No. 4,641,737 for the other end of the cycle of the one system (e.g., the door is opened) are provided on the other side of the gear 22. A spring 25 in the form of a coil or any other suitable form is arranged around the shaft 19 to bias the gear 22 toward the translating nut drive gear 20 and provide a driving connection therebetween when the balls of the ball ramp 23 are in their respective sockets so that gears 20 and 22 rotate together.

A third shaft 26 is shown arranged adjacent the second shaft 19 for actuation of the second system (e.g., a pallet which goes up and down after a cargo door is open). An input gear 27 is rotatably fixed on the shaft 26 for providing input power to cycle the second system (e.g., raise and lower the pallet). A second system stop gear 28 is fixed to the shaft 26 toward an end of the shaft 26 opposite the input gear 27. At the end of the shaft 26 opposite the input gear 27 are overtravel stops 29 signalling by known means the completion of one end of the cycle of the second system (e.g, when the pallet is fully down) and preventing unexpected overtravel of the second system. Trigger stops 30,31', are provided adjacent the overtravel stops 29 and stop gear 28, respectively. The circumference of shaft 26 is threaded along an axial portion 43 between the trigger stops 30,31' to matingly receive therein a second differential gear 32 in the form of a translating motion nut for axial movement along the shaft 26 between the stops 30,31'. The gear 32 has members 31 on each side to engage with the trigger stops 30,31'.

Overtravel stops 33 for signalling by known means the completion of the other end of the cycle of the second system (e.g., when the pallet is fully up) are provided on the shaft 19 and are fixed to the rotating member 34. The outer periphery of the rotating member 34 which rotates about the shaft 19 is provided with gear teeth 35 located and sized to mate with gear teeth on the stop gear 28. It is within the scope of the present invention that the shaft 19 can be a non-rotating shaft. Furthermore, although in the illustrated embodiment the shaft 19 is not directly connected to gear 22 or overtravel stops 33, it could be so directly connected within the scope of the present invention.

A translating nut drive gear 36 for the second system (e.g., the aforementioned pallet) is rotatingly arranged on the shaft 19 by way of bearings 37. A ball ramp 38 of a known type is provided between adjacent faces of the member 34 and the translating nut drive gear 36 which are urged together by the spring 25. The translating nut drive gear 36 meshes with the second differential gear 32.

A stop cam 39 is provided between the overtravel stops 29 and the trigger stop 30 on the shaft 26 to prevent further rotation of shaft 26 when the differential gear 32 abuts the trigger stop 30 and causes the trigger stop to be forced against overtravel stops 29. A stationary stop 40 and a push stop 41 are provided on a member 42 which axially and rotatively fixedly connects the overtravel stops 29 to the shaft 26 for rotation therewith. A compression spring 44 is arranged around the outside of member 42 with a sufficient spring constant to urge the stop 41 away from the stop 40 but with a weaker spring constant than spring 25 to prevent nuisance trips of the overtravel stops 29 caused by the ball ramp signal.

The shafts 12, 19 and 26 are suitably supported for rotation and are provided with appropriate conventional bearings at the ends thereof for permitting rotation in actuating first the one system and then the second system.

In describing the operation of the timing mechanism in accordance with the present invention shown in FIG. 2, it will be assumed that, in the pallet/door example of the two systems, the start of a cycle involves the pallet brake (FIG. 1) holding the pallet (second system) stationary in the up position which allows the sun-to-sun differential to be grounded for releasing the door brake to begin opening the door (first system). This is the position of the timing mechanism illustrated in solid line in FIG. 2.

As the door is opened through the input gear 11 to rotate the shaft 12, the input gear 11 also rotates the gear 22 meshing with input gear 11. Due to the biasing force of the spring 25 and the balls of the ball ramp 23 being in their sockets, the door translating nut gear 20 is constrained to rotate with the gear 22 through the ball ramp 23. During the door opening and closing actuation cycles, the ball ramp 38 is in the open condition, i.e. the balls are maintained out of their sockets to keep the trigger stops 30,31 together. The differential gear 14 which meshes with the translating nut drive gear 20 causes the gear 14 to rotate and translate axially along the threaded portion of shaft 12. The differential gear 14 which at the beginning of the door opening cycle was adjacent the stop 15 (as shown in dotted lines) has been moved to the solid line position in FIG. 2.

Inasmuch as the translating gear 14 is part of a differential gear system, it has a larger number of teeth than the adjacent input gear 11. This causes the gear 14 to rotate more slowly than the door input gear 11 and to slowly turn the differential 14 on the screw thread 13 to simulate the door position. Of course, it will be appreciated that the various components will have to be sized in a known manner to provide the desired positional relationship described herein.

When the door has been completely opened, the differential gear 14 will have contacted the trigger stop 16' so that the differential gear 14 and door input gear 11 are constrained to rotate together but at different rotational velocities to cause the nut drive gear 20 and gear 22 to rotate at different speeds, thereby separating the balls on the ball ramp 23 from their respective sockets and compressing spring 25 to trigger a signal to a motor resetting for the brakes in which the pallet brake disengages and the door brake engages. Since triggering and brake actuation can occur in a known manner and do not form part of the present invention, the details of brake engagement and disengagement need not be described here. It is only important to an understanding of the present invention to know that the sun-to-sun differential has a new grounding point after door opening has been completed so that the doors will not be actuated during pallet raising and lowering. The ball ramp 23 thereafter remains separated during the actuation of the pallet (second system) cycle. The brake mechanism which provides the ground also keeps the ball ramp 23 together.

Figure 3A:
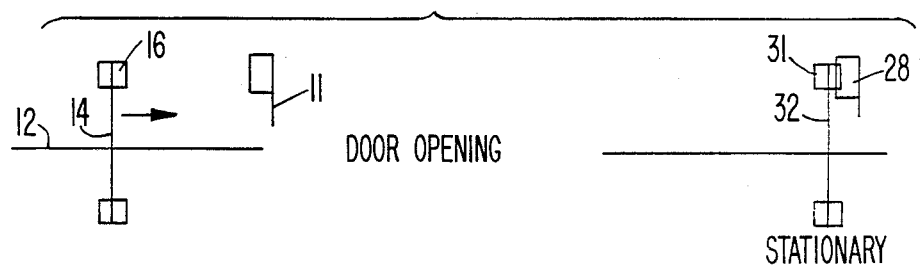
FIGS. 3A-3D are schematic views of the operation of trigger stops during activation of each system.
Figure 3B:
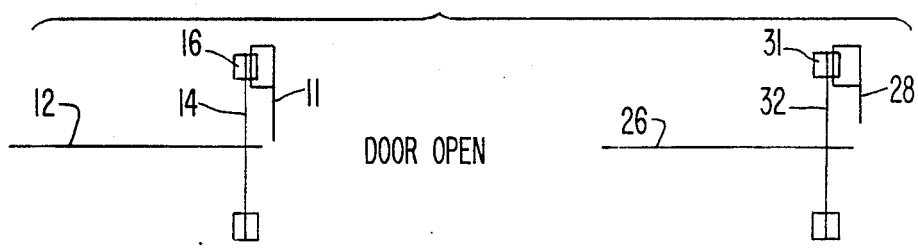
Figure 3C:

The pallet actuation cycle, which begins to lower the pallet after opening of the door, begins with an input to the gear 27 which rotates the shaft 26. The ball ramp 38 was open during the door opening cycle. The trigger stops 31,31' were maintained together via the spring 25 initially acting through the gear 22, nut drive gear 20, associated ball race and member 34 as shown in FIG. 3B and described below in more detail. However, as the balls in the ball ramp 38 begin to turn they return to their respective sockets upon turning of the shaft 26 to close the ball ramp 38, and the trigger stops 31,31' begin to separate due to differential speed between the stop gear 28 and the differential gear 32 which has a larger number of teeth as shown in FIG. 3C and described below. Spring 25 now causes gears 35 and 36 to rotate together. The differential gear 32 moves to the left as viewed in FIG. 2 and is sized to count the revolutions of the shaft 26 so as to determine when the pallet has been fully lowered at the end of the travel of the differential gear 32.

Figure 3D:
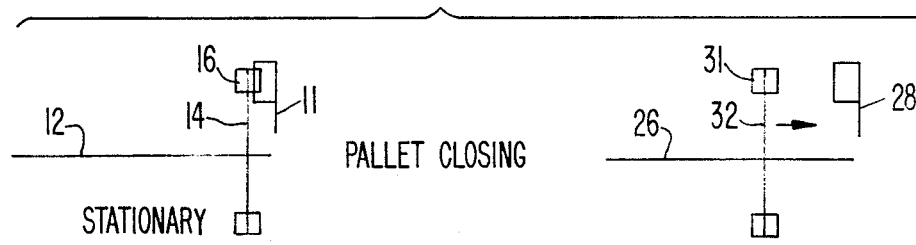

At the appropriate time, a signal is sent to a motor (not shown) which provides input power in the reverse direction to the input gear 27 to raise the pallet. Now the differential (or translating motion nut) 32 moves toward the right as viewed in FIG. 2 as shown in FIG. 3D and contacts the trigger stop 31' when the pallet is in the fully raised position. When the gear or nut 32 contacts the stop 31', the differential speed between the gear 36 and the member 34 by virtue of the larger number of teeth on the nut 32 than are on the stop gear 28 causes the balls in the ball ramp 38 to travel out of their sockets and to compress the coil spring so as to trigger a signal to the brake actuation system to activate the pallet brake and deactivate the door brake.

FIGS. 3A-3D illustrate schematically the relationship of the trigger stops during operation of each system. For instance, during the opening movement of the door shown in FIG. 3A, the gear 14 is travelling to the right whereas the translating nut 32 is stationary with its trigger stops 31 engaged against the gear 28. When the door is open as shown in FIG. 3B, the trigger stops 16,31 are engaged with gears 11,28, respectively. FIG. 3B also illustrates the position of the translating gears 14,32 when the pallet is in its retracted or closed position. When the door is open and the pallet starts to extend or open as shown in FIG. 3C, the translating gear 14 remains stationary and the gear 32 moves to the left. Likewise, when the pallet is retracted towards its closed position as shown in FIG. 3D, the gear 14 is stationary and the gear 32 now moves to the right.

The door and pallet overtravel stops 17, 29, 33 and 45 are provided in the unusual but possible event that either the door or the pallet travels beyond its normal stroke. For example, if the pallet is permitted to travel further down than designed for in normal operation, the differential gear 32 will contact trigger stop 30 which through the stop cam 39 pushes stop 41 into the stationary stop 40. If the door opens too far, the balls in the ball ramp 23 will move further out of their respective sockets than normal, thereby forcing stop 22 into stop 45, and stopping further movement of the door. However, it should also be understood that the overtravel stops could be eliminated without departing from the scope of the present invention.

While I have shown and described at least one preferred embodiment for carrying out the invention, it will be understood that the same is susceptible of numerous changes and modifications without departing from the scope of the invention. Therefore, I do not intend to be limited by the changes shown and described herein but intend to cover all such changes and modifications as are encompassed by the scope of the appended claims.

What is claimed is:

1. An apparatus comprising:
    a first system including a first differential mechanism movable between a first state and a second state;
    a second system including a second differential mechanism movable between a first state and a second state;
    a first brake mechanism for selectively preventing movement of the first system;
    a second brake mechanism for selectively preventing movement of the second system;
    means for selectively actuating one of the first and second brake mechanisms; and
    means receiving inputs from the movement of the first and second differential mechanisms for providing a signal to the selective actuation means such that the second system is braked during actuation of the first system between its first and second state and then said first system is braked during actuation of the second system between its first and second state.

2. An apparatus according to claim 1, wherein said inputs receiving means including means for actuating a first system of the two systems, means for actuating a second system of the two systems, means for preventing actuation of the second system until the first system has been actuated to a desired state and for preventing actuation of the first system until the second system has been actuated to a desired state.

3. A timing mechanism for sequential activation of two separate system, comprising means for actuating a first system of the two system, means for actuating a second system of the two systems, means for preventing actuation of the second system until the first system has been actuated to a desired state and for preventing actuation of the first system until the second system has been actuated to a desired state, wherein said first system actuating means includes a first input gear and a first differential mechanism movable relative to said first input gear in predetermined proportion to the movement of the first system between two states.

4. A timing mechanism according to claim 3, wherein said actuation preventing means includes a common shaft operatively associated with the first system actuating means and the second system actuating means, a first system translating nut drive gear is rotatably mounted on said common shaft in meshing relationship with said first differential mechanism, a first driven gear fixed on one end of said common shaft and meshing with said first system translating nut driven gear toward said first system translating nut drive gear such that said ball ramp means selectively provides a driving connection therebetween during actuation of the first system but not during actuation of the second position, whereby upon actuation of the first system to a desired state a signal will be triggered to prevent further actuation of the first system and only then to permit actuation of the second system.

5. A timing mechanism according to claim 3, whereby overtravel stop means are operatively associated with said first system actuating means, second system actuating means and said actuating preventing means for maintaining the first and second systems in their desired paths of travel.

6. A timing mechanism according to claim 3, wherein said second system actuating means includes a second input gear and a second differential mechanism movable relative to said second input gear in predetermined proportion to the movement of the second system between two states.

7. A timing mechanism according to claim 6, wherein said actuation preventing means includes a common shaft operatively associated with the first system actuating means and the second system actuating means, first and second system translating nut drive gears are rotatably mounted on said common shaft in respective meshing relationship with said first and second differential mechanisms, first and second driven gears fixed on said common shaft in respective meshing relationship with said first and second input gears, first ball ramp means between said first system translating nut drive gear and said first driven gear, second ball ramp means between said second system translating nut drive gear and said second driven gear, and means for biasing the first driven gear toward said first system translating nut drive gear and for biasing the second driven gear toward said second system translating nut drive gear such that said first ball ramp means provides a driving connection between the first driven gear and the first system translating nut drive gear only during actuation of the first system and a driving connection between the second driven gear and the second system translating nut drive gear only during actuation of the second system, whereby upon actuation of the first system to its desired state a first signal will be triggered to prevent further actuation of the first system to then permit actuation of the second system, and upon actuation of the second system to its desired state a second signal will be triggered to prevent further actuation of the second system to then permit actuation of the first system.

8. A timing mechanism according to claim 7, whereby overtravel stop means are operatively associated with said first system actuating means, second system actuating means and said actuating preventing means for maintaining the first and second systems in their desired paths of travel.

9. A timing mechanism according to claim 3, wherein said first input gear is mounted on a first shaft for rotating and said first differential mechanism is axially movable along said first shaft while being rotatable at a different speed relative to said first input gear.

10. A timing mechanism according to claim 9, wherein said first differential mechanism is operatively arranged on said first shaft such that end limits of travel of said first differential mechanism along said first shaft correspond to desired states of the first system.

11. A timing mechanism according to claim 10, wherein said actuation preventing means includes a common shaft operatively associated with the first system actuating means and the second system actuating means, a first system translating nut drive gear is rotatably mounted on said common shaft in meshing relationship with said first differential mechanism, a first driven gear fixed on one end of said common shaft and meshing with said first system translating nut driven gear toward said first system translating nut drive gear such that said ball ramp means selectively provides a driving connection therebetween during actuation of the first system but not during actuation of the second position, whereby upon actuation of the first system to a desired state a signal will be triggered to prevent further actuation of the first system and only then to permit actuation of the second system.

12. A timing mechanism according to claim 11, whereby overtravel stop means are operatively associated with said first system actuating means, second system actuating means and said actuating preventing means for maintaining the first and second systems in their desired paths of travel.

13. A timing mechanism according to claim 9, wherein said second system actuating means includes a second input gear and a second differential mechanism movable relative to said second input gear in predetermined proportion to the movement of the second system between two states.

14. A timing mechanism according to claim 13, wherein said actuation preventing means includes a common shaft operatively associated with the first system actuating means and the second system actuating means, first and second system translating nut drive gears are rotatably mounted on said common shaft in respective meshing relationship with said first and second differential mechanisms, first and second driven gears fixed on said common shaft in respective meshing relationship with said first and second input gears, first ball ramp means between said first system translating nut drive gear and said first driven gear, second ball ramp means between said second system translating nut drive gear and said second driven gear, and means for biasing the first driven gear toward said first system translating nut drive gear and for biasing the second driven gear toward said second system translating nut drive gear such that said first ball ramp means provides a driving connection between the first driven gear and the first system translating nut drive gear only during actuation of the first system and a driving connection between the second driven gear and the second system translating nut drive gear only during actuation of the second system, whereby upon actuation of the first system to its desired state a first signal will be triggered to prevent further actuation of the first system to then permit actuation of the second system, and upon actuation of the second system to its desired state a second signal will be triggered to prevent further actuation of the second system to then permit actuation of the first system.

15. A timing mechanism according to claim 14, whereby overtravel stop means are operatively associated with said first system actuating means, second system actuating means and said actuating preventing means for maintaining the first and second systems in their desired paths of travel.

16. An apparatus, comprising:
a first system movable between a first state and a second state;
a second system movable between a first state and a second state;
a first brake mechanism for selectively preventing movement of the first system;
a second brake mechanism for selectively preventing movement of the second system;
means for selectively actuating one of the first and second brake mechanisms; and
means receiving inputs from the movement of the first and second systems for providing a signal to the selective actuation means such that the second system is braked during actuation of the first system between its first and second state and then said first system is braked during actuation of the second system between its first and second state, said inputs receiving means including means for actuating a first system of the two systems, means for actuating a second system of the two systems, means for preventing actuation of the second system until the first system has been actuated to a desired state and for preventing actuation of the first system until the second system has been actuated to a desired state, wherein said first system actuating means includes a first input gear and a first differential mechanism movable relative to said first input gear in predetermined proportion to the movement of the first system between two states.

17. An apparatus according to claim 16, wherein said actuation preventing means includes a common shaft operatively associated with the first system actuating means and the second system actuating means, a first system translating nut drive gear is rotatably mounted on said common shaft in meshing relationship with said first differential mechanism, a first driven gear fixed on one end of said common shaft and meshing with said first system translating nut driven gear toward said first system translating nut drive gear such that said ball ramp means selectively provides a driving connection therebetween during actuation of the first system but not during actuation of the second position, whereby upon actuation of the first system to a desired state a signal will be triggered to prevent further actuation of the first system and only then to permit actuation of the second system.

18. An apparatus according to claim 16, whereby overtravel stop means are operatively associated with said first system actuating means, second system actuating means and said actuating preventing means for maintaining the first and second systems in their desired paths of travel.

19. An apparatus according to claim 16, wherein said second system actuating means includes a second input gear and a second differential mechanism movable relative to said second input gear in predetermined proportion to the movement of the second system between two states.

20. An apparatus according to claim 19, wherein said actuation preventing means includes a common shaft operatively associated with the first system actuating means and the second system actuating means, first and second system translating nut drive gears are rotatably mounted on said common shaft in respective meshing relationship with said first and second differential mechanisms, first and second driven gears fixed on said common shaft in respective meshing relationship with said first and second input gears, first ball ramp means between said first system translating nut drive gear and said first driven gear, second ball ramp means between said second system translating nut drive gear and said second driven gear, and means for biasing the first driven gear toward said first system translating nut drive gear and for biasing the second driven gear toward said second system translating nut drive gear such that said first ball ramp means provides a driving connection between the first driven gear and the first system translating nut drive gear only during actuation of the first system and a driving connection between the second driven gear and the second system translating nut drive gear only during actuation of the second system, whereby upon actuation of the first system to its desired state a first signal will be triggered to prevent further actuation of the first system to then permit actuation of the second system, and upon actuation of the second system to its desired state a second signal will be triggered to prevent further actuation of the second system to then permit actuation of the first system.

21. An apparatus according to claim 20, whereby overtravel stop means are operatively associated with said first system actuating means, second system actuating means and said actuating preventing means for maintaining the first and second systems in their desired paths of travel.

22. An apparatus according to claim 16, wherein said first input gear is mounted on a first shaft for rotating and said first differential mechanism is axially movable along said first shaft while being rotatable at a different speed relative to said first input gear.

23. An apparatus according to claim 22, wherein said first differential mechanism is operatively arranged on said first shaft such that end limits of travel of said first differential mechanism along said first shaft correspond to desired states of the first system.

24. An apparatus according to claim 23, wherein said actuation preventing means includes a common shaft operatively associated with the first system actuating means and the second system actuating means, a first system translating nut drive gear is rotatably mounted on said common shaft in meshing relationship with said first differential mechanism, a first driven gear fixed on one end of said common shaft and meshing with said first system translating nut driven gear toward said first system translating nut drive gear such that said ball ramp means selectively provides a driving connection therebetween during actuation of the first system but not during actuation of the second position, whereby upon actuation of the first system to a desired state a signal will be triggered to prevent further actuation of the first system and only then to permit actuation of the second system.

25. An apparatus according to claim 24, whereby overtravel stop means are operatively associated with said first system actuating means, second system actuating means and said actuating preventing means for maintaining the first and second systems in their desired paths of travel.

26. An apparatus according to claim 22, wherein said second system actuating means includes a second input gear and a second differential mechanism movable relative to said second input gear in predetermined proportion to the movement of the second system between two states.

27. An apparatus according to claim 26, wherein said actuation preventing means includes a common shaft operatively associated with the first system actuating means and the second system actuating means, first and second system translating nut drive gears are rotatably mounted on said common shaft in respective meshing relationship with said first and second differential mechanisms, first and second driven gears fixed on said common shaft in respective meshing relationship with said first and second input gears, first ball ramp means between said first system translating nut drive gear and said first driven gear, second ball ramp means between said second system translating nut drive gear and said second driven gear, and means for biasing the first driven gear toward said first system translating nut drive gear and for biasing the second driven gear toward said second system translating nut drive gear such that said first ball ramp means provides a driving connection between the first driven gear and the first system translating nut drive gear only during actuation of the first system and a driving connection between the second driven gear and the second system translating nut drive gear only during actuation of the second system, whereby upon actuation of the first system to its desired state a first signal will be triggered to prevent further actuation of the first system to then permit actuation of the second system, and upon actuation of the second system to its desired state a second signal will be triggered to prevent further actuation of the second system to then permit actuation of the first system.

28. An apparatus according to claim 27, whereby overtravel stop means are operatively associated with said first system actuating means, second system actuating means and said actuating preventing means for maintaining the first and second systems in their desired paths of travel.

* * * * *